(12) United States Patent
Kennedy et al.

(10) Patent No.: US 8,782,535 B2
(45) Date of Patent: Jul. 15, 2014

(54) ASSOCIATING ELECTRONIC CONFERENCE SESSION CONTENT WITH AN ELECTRONIC CALENDAR

(71) Applicant: International Business Machines Corporation, Armonk, NY (US)

(72) Inventors: John Kennedy, Goatstown (IE); Paula Prendergast, Ratoath (IE); Ronan Redican, Ashtown (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/676,572

(22) Filed: Nov. 14, 2012

(65) Prior Publication Data

US 2014/0136994 A1 May 15, 2014

(51) Int. Cl.
*G06F 3/00* (2006.01)
*G06Q 10/10* (2012.01)
*G06F 3/0481* (2013.01)

(52) U.S. Cl.
CPC .............. *G06Q 10/10* (2013.01); *G06F 3/0481* (2013.01)
USPC .......................................... 715/753; 715/751

(58) Field of Classification Search
None
See application file for complete search history.

(56) References Cited

U.S. PATENT DOCUMENTS

| | | | |
|---|---|---|---|
| 7,509,388 B2 | 3/2009 | Allen et al. | |
| 7,630,986 B1 | 12/2009 | Herz et al. | |
| 7,637,196 B2 | 12/2009 | Thornton | |
| 7,680,895 B2 | 3/2010 | Perlow et al. | |
| 7,693,736 B1* | 4/2010 | Chu et al. | 705/7.19 |
| 7,716,217 B2 | 5/2010 | Marston et al. | |
| 7,814,159 B2 | 10/2010 | Sego et al. | |
| 7,853,471 B2 | 12/2010 | Zurko et al. | |
| 7,953,806 B2 | 5/2011 | Lyle et al. | |
| 2006/0036619 A1 | 2/2006 | Fuerst et al. | |
| 2006/0167994 A1 | 7/2006 | Chen et al. | |
| 2006/0168582 A1 | 7/2006 | Muller et al. | |
| 2007/0016614 A1 | 1/2007 | Novy | |
| 2007/0061393 A1 | 3/2007 | Moore | |
| 2007/0106536 A1 | 5/2007 | Moore | |
| 2007/0106537 A1 | 5/2007 | Moore | |
| 2007/0106750 A1 | 5/2007 | Moore | |
| 2007/0106751 A1 | 5/2007 | Moore | |
| 2007/0106752 A1 | 5/2007 | Moore | |
| 2007/0106753 A1 | 5/2007 | Moore | |
| 2007/0106754 A1 | 5/2007 | Moore | |
| 2007/0116036 A1 | 5/2007 | Moore | |
| 2007/0116037 A1 | 5/2007 | Moore | |

(Continued)

OTHER PUBLICATIONS

"Integrating instant messaging into calendaring systems," [Online] International Business Machines Corporation, IPCom000152647D, May 9, 2007, retrieved from the Internet: <http://ip.com/IPCOM/000152647>, 1 pg.

(Continued)

*Primary Examiner* — Matt Kim
*Assistant Examiner* — Maryam Ipakchi
(74) *Attorney, Agent, or Firm* — Cuenot, Forsythe & Kim, LLC

(57) ABSTRACT

Prior to, or during, a first electronic conference session, a user input is received indicating a request to record content of a first electronic conference session. Responsive to the user request, content of the first electronic conference session can be recorded. The recorded content of the first electronic conference session can be associated with at least one calendar entry in the electronic calendar.

25 Claims, 4 Drawing Sheets

(56) References Cited

U.S. PATENT DOCUMENTS

| | | |
|---|---|---|
| 2007/0168461 A1 | 7/2007 | Moore |
| 2007/0179945 A1 | 8/2007 | Marston et al. |
| 2007/0186172 A1 | 8/2007 | Sego et al. |
| 2007/0239376 A1 | 10/2007 | Reiner |
| 2007/0300164 A1 | 12/2007 | Bhogal et al. |
| 2008/0040151 A1 | 2/2008 | Moore |
| 2008/0071868 A1 | 3/2008 | Arengurg et al. |
| 2008/0168134 A1 | 7/2008 | Goodman et al. |
| 2008/0270661 A1 | 10/2008 | Plumpton |
| 2008/0270916 A1 | 10/2008 | Chen et al. |
| 2009/0030731 A1 | 1/2009 | Reiner |
| 2009/0030984 A1 | 1/2009 | Chen et al. |
| 2009/0049131 A1 | 2/2009 | Lyle et al. |
| 2009/0119172 A1 | 5/2009 | Soloff |
| 2009/0172773 A1 | 7/2009 | Moore |
| 2009/0222552 A1 | 9/2009 | Chroscielewski et al. |
| 2009/0247934 A1 | 10/2009 | Tracey et al. |
| 2009/0248401 A1 | 10/2009 | Grabarnik et al. |
| 2009/0254971 A1 | 10/2009 | Herz et al. |
| 2009/0271716 A1 | 10/2009 | Jones et al. |
| 2010/0030734 A1 | 2/2010 | Chunilal |
| 2010/0198142 A1 | 8/2010 | Sloan et al. |
| 2010/0268534 A1 | 10/2010 | KishanThambiratnam et al. |
| 2010/0269071 A1 | 10/2010 | Bhide et al. |
| 2010/0318399 A1* | 12/2010 | Li et al. .............................. 705/9 |
| 2011/0099006 A1* | 4/2011 | Sundararaman et al. ...... 704/208 |
| 2011/0167357 A1* | 7/2011 | Benjamin et al. ............. 715/753 |
| 2011/0185288 A1 | 7/2011 | Gupta et al. |
| 2011/0271208 A1* | 11/2011 | Jones et al. .................... 715/753 |
| 2011/0320958 A1* | 12/2011 | Kashi ............................. 715/751 |
| 2012/0284638 A1* | 11/2012 | Cutler et al. ................... 715/751 |

OTHER PUBLICATIONS

"System and Method of Setting Up a Calendar Entry Based on Exchanging Message," [Online] IPCom000210026D, Aug. 22, 2011, retrieved from the Internet: <http://ip.com/IPCOM/000210026>, 1 pg.

* cited by examiner

132

| | 29 Monday | 30 Tuesday | 31 Wednesday | 1 Thursday | 2 Friday |
|---|---|---|---|---|---|
| 7:00 AM | | | | | |
| 8:00 AM | | | 202 | | |
| 9:00 AM | | 212 Web Conf | | | 206 |
| 10:00 AM | | | 220 | 216 | Chat Room |
| 11:00 AM | | | 230 | | |
| 12:00 AM | | 214 | IM | 204 | |
| 1:00 PM | | | | | 240 Scheduled IM |
| 2:00 PM | | | | | |
| 3:00 PM | | | | | |
| 4:00 PM | | | | | |
| 5:00 PM | | | | | |
| 6:00 PM | | | | | |
| 7:00 PM | | | | | |

FIG. 2

ASSOCIATING ELECTRONIC CONFERENCE SESSION CONTENT WITH AN ELECTRONIC CALENDAR

BACKGROUND

Arrangements described herein relate to electronic conferencing.

Examples of electronic conferences include web conferences and instant messaging (IM). The use of electronic conferences has grown significantly over the last decade, facilitated by the proliferation of communication networks, such as the Internet and mobile communication networks, and increases in available bandwidth. These services are valuable tools in the present communication age.

Web conferencing is a service that allows conferencing events to be shared with remote locations. In general, the service is made possible by Internet technologies, particularly on TCP/IP connections. Web conferencing allows real-time point-to-point communications as well as multicast communications from one sender to many receivers during a Web conference. Further, Web conferencing offers information, such as text based messages, voice and video chat to be simultaneously shared across geographically dispersed locations.

IM is a form of communication in which text-based messages are transmitted from a sender to one or more receivers in real-time via a communication network. In this regard, IM may include point-to-point communications from the sender to a single user, as well as multicast communications from the sender to multiple users. An IM message may include one or more attachments, such as documents, images, audio/video files, etc. Sometimes IM is implemented via IM clients on respective client devices that provide a user interface for users to generate/send IM messages, and to receive and view IM messages sent by other users. Other times IM is implemented using a chat session hosted on a server that supports the exchange of IM messages among users, for example in a chat room. A dedicated IM client typically is not required to access a chat room. Instead, users may access a chat room using a typical web browser.

BRIEF SUMMARY

One or more embodiments disclosed within this specification relate to associating electronic conference session content with an electronic calendar.

An embodiment can include a method. The method can include prior to, or during, a first electronic conference session, receiving a user input indicating a request to record content of the first electronic conference session. Responsive to the user request, via a processor, content of the first electronic conference session can be recorded. The recorded content of the first electronic conference session can be associated with at least one calendar entry in the electronic calendar. In one arrangement, associating the recorded content with at least one calendar entry in the electronic calendar can include delineating in the calendar entry a period corresponding to a portion of the first electronic conference session in which the user participated to distinguish recorded content for that portion from recorded content of at least one other portion of the first electronic conference session.

Another embodiment can include a system having a processor programmed to initiate executable operations. The executable operations can include prior to, or during, a first electronic conference session, receiving a user input indicating a request to record content of the first electronic conference session. Responsive to the user request, content of the first electronic conference session can be recorded. The recorded content of the first electronic conference session can be associated with at least one calendar entry in the electronic calendar.

Another embodiment can include a computer program product for associating electronic conference session content with an electronic calendar. The computer program product can include a computer-readable storage medium having program code stored thereon, the program code executable by a processor to perform a method. The method can include prior to, or during, a first electronic conference session, receiving a user input indicating a request to record content of the first electronic conference session. Responsive to the user request, content of the first electronic conference session can be recorded. The recorded content of the first electronic conference session can be associated with at least one calendar entry in the electronic calendar.

BRIEF DESCRIPTION OF THE SEVERAL VIEWS OF THE DRAWINGS

FIG. 2 is an example of an electronic calendar in accordance with one embodiment disclosed within this specification.

DETAILED DESCRIPTION

Figure 1:
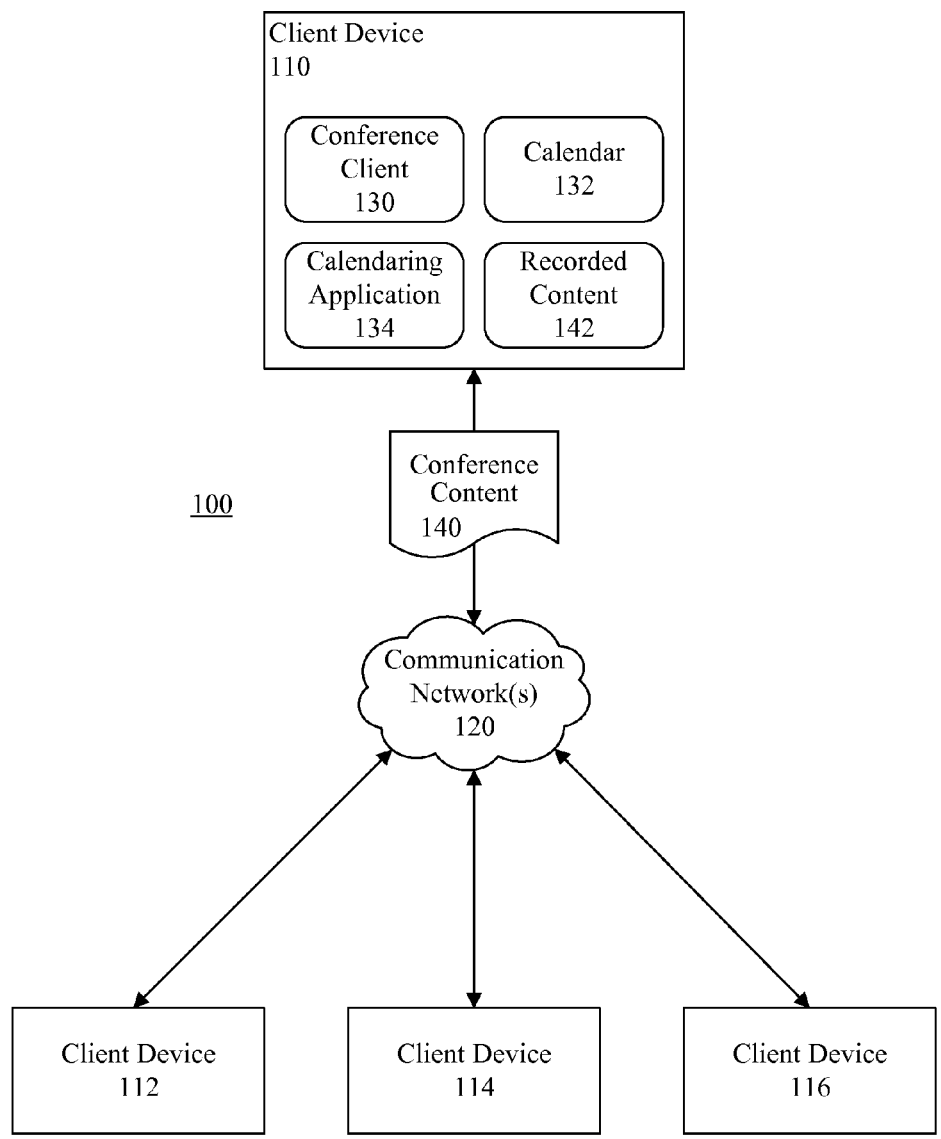
FIG. 1 is a block diagram illustrating a system for integrating an electronic conference session with an electronic calendar in accordance with one embodiment disclosed within this specification.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium refers to a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Arrangements described herein relate to associating electronic conference session content with an electronic calendar (hereinafter "calendar"). As used herein, the term "electronic conference session" means a communication session involving two or more participants in which information is communicated via a communications network. Examples of an electronic conference session include, but are not limited to, a web conference, a chat session and an instant messaging (IM) session. Further, a conference session may be hosted by a social networking site, but the invention is not limited in this regard. In illustration, a social networking site can provide an IM client or a chat room used by participants to participate in an electronic conference session.

The electronic conference session (hereinafter "conference session") can be recorded at the behest of a user (e.g., a participant in the conference session), for example in response to a user input indicating a request to record the conference session prior to, or during, the conference session. The recorded content is associated with a respective calendar entry in the calendar. Accordingly, the user can, via the calendar, access the recording of the conference session to review content presented therein, for example at a later time.

FIG. 1 is a block diagram illustrating a system 100 for integrating an electronic conference session with an electronic calendar in accordance with one embodiment disclosed within this specification. The system can include a plurality of client devices 110, 112, 114, 116 communicatively linked via one or more communication networks 120. The communication network(s) 120 can include one or more LANs (wired and/or wireless), one or more WANs (wired and/or wireless), one or more cellular communication networks, the Internet and/or the like. Examples of the client devices 110-116 include, but are not limited to, computers (e.g., workstations, desktop computers, mobile computers, laptop computers, net books, tablet computers, etc.), smart phones, personal digital assistants, network appliances, and the like.

In one arrangement, the client device 110 can include a conference client 130, a calendar 132 and a calendaring application 134 that manages the calendar. Indeed, the calendar 132 can be presented to a user within a view of the calendaring application 134. The conference client 130 can be an IM client, a chat client, a web conference client, a web browser, or any other application executable by a processor of the client device 110 via which a user may participate in a conference session. In another arrangement, the conference client 130, the calendar 132 and/or the calendaring application 134 can be hosted on another system or device, for example on a server, and a user can access the conference client 130, the calendar 132 and/or the calendaring application 134 via a web browser or other suitable application executing on the client device 110. In one non-limiting example, the calendar 132 and/or the calendaring application 134 can be hosted by a social networking site. The client devices 112-116 also can include respective conference clients (not shown), calendars (now shown) and/or calendaring applications (not shown), or such components can be hosted on another device or system and accessed via respective web browsers or other applications executed on the client devices 112-116.

In operation, prior to, or during a conference session, a user of the client device 110 can enter into the client device 110 a user input indicating a request to record the conference session. For example, the user can select a menu item, icon, button or the like in the conference client 130 or the calendaring application 134. While participating in the conference session, via the conference client 130, the user can communicate conference content 140 to one or more other participants. Similarly, via the client devices 112-116, one or more other participants can communicate conference content 140 to the user and other participants who may be participating in the conference session. The conference content 140 can include IM messages, chat messages, pictures, images, graphics, diagrams, presentation slides, audio, video, audio/video content, and/or the like.

The conference client 130, or another application or plugin communicatively linked to the conference client 130, such as the calendaring application 134, can record the conference content 140 to generate recorded content 142. In illustration, if prior to the conference session the user entered a user input requesting the conference content 140 to be recorded, the conference client 130 (or other application) can begin recording the conference content 140 when the conference starts, or when the user joins the conference session. If during the conference session the user enters a user input requesting the conference content 140 to be recorded, the recording can begin when such user input is received by the client device 110. In one arrangement, the conference content 140 need only be recorded while the user continues to participate in the conference session, and thus the recorded content can be limited to the portion of the conference session in which the user participated. In another arrangement, the recording can continue until the conference session is complete. Further, if prior to the conference session the user indicated that the conference session was to be recorded, the recording can begin when the conference session begins. Alternatively, the user preferences or settings can indicate that the recording is to begin when the user joins the conference session. Users of the client devices 112-116 also can record the conference session in a similar manner.

The recorded content 142 can be stored locally on the client device 110, for example to a machine-readable storage device contained in, or attached to, the client device 110. In another arrangement, the recorded content 142 can be stored to another device or system to which the client device 110 is communicatively linked, for example to a server, a network-attached storage (NAS), or the like. Further, the recorded content 142 can be associated with an entry in the calendar 132. Similarly, other conference sessions can be recorded and stored, and such recordings can be associated with respective entries in the calendar 132.

In one arrangement, the recorded content 142 can include a transcript of the conference session, for example text of IM messages and chat messages exchanged during the conference session. In the case that audio was presented during the conference session, speech recognition can be applied to generate a transcript of spoken utterances generated during the conference session. The present arrangements are not limited in this regard, however. Indeed, the recorded content 142 can include audio and/or video generated during the conference session. The recorded content also can include any images, pictures, graphics, diagrams, presentation slides, etc., presented in the conference session. In one non-limiting arrangement, the recording can be limited to content presented by the user, or limited to content presented by one or more other participants in the conference session.

FIG. 2 is an example of an electronic calendar 132 in accordance with one embodiment disclosed within this specification. The calendar 132 can include one or more entries 202, 204, 206 with which respective recorded content is associated. For example, the entry 202 can correspond to recorded content of a web conference, the entry 204 can correspond to recorded content of an IM session and the entry 206 can correspond to recorded content of a chat room session. Each calendar entry 202-206 can indicate respective information 212, 214, 216 related to the recorded content. In illustration, the information can indicate a type of conference session, details about the conference session, and so on. The type of conference session can be automatically identified when the conference session is recorded. In one arrangement, the user can be prompted to enter details related to the conference session, or such details can be generated based on a transcript of the conference session. For example, if the analysis of the web conference indicated by the calendar entry 202 determines that the web conference pertained to a particular subject, the information 212 can indicate the subject.

In one aspect, whether the calendar entries 202-206 are displayed in the calendar 132 can be based on a user selectable setting or selection. For instance, by default, the calendar entries 202-206 need not be presented. A user, however, can select a menu item, icon or button to indicate the user desires the calendar entries 202-206 to be presented. Accordingly, the calendar 132 can refresh to display the entries 202-206. In another arrangement, the calendar entries 202-206 can be displayed in the calendar 132 by default, and the user can select a menu item, icon or button to indicate the user desires the calendar entries 202-206 not to be presented. Accordingly, the calendar 132 can refresh to remove the calendar entries 202-206 from being presented. Further, a user selectable setting can be provided in the conference client 130 to enable the user to indicate whether the calendar entries 202-206 are to be presented in the calendar 132. Each time the calendar is opened, whether the calendar entries 202-206 are presented in the calendar 132 can be determined by such setting.

The calendar entries 202-206 can correlate to the actual day and time that the respective conference sessions occur. In illustration, if the web conference occurred on Tuesday from 9:00 AM to 10:30 AM, and the entire content of the web conference was recorded, the calendar entry 202 can indicate such, for example by extending from 9:00 AM to 10:30 AM on Tuesday in the calendar 132. In one arrangement, if the user only participated in a portion of the conference session, the period in which the user participated can be delineated in the calendar. In illustration, if the user participated from 9:15 AM to 10:00 AM, that period 220 can be indicated in the calendar entry 202 using a suitable indicator that distinguishes the period 220 from one or more other portions of the calendar entry 202, for example using a particular background color, highlighting, a graphic effect, a textual effect, etc. Accordingly, when the user wishes to access the recorded content via the calendar 132, the user can see the period over which the conference session was recorded and the period in which the user participated.

When accessing the recorded content, the user can choose to access the entire recorded content, or only the content recorded while the user participated in the conference session. In illustration, when access to the recorded content is requested, the calendar 132 (or another application communicatively linked to the calendar 132, such as the calendaring application) can prompt the user to indicate whether the user wants to review the entire recorded content, or only the content recorded while the user participated in the conference session. In another arrangement, if the user selects the calendar entry 202 by selecting the entry 202 with a cursor outside the period 220, the entire recorded content can be presented to the user. If the user selects the calendar entry 202 by selecting the entry 202 within the period 220, only the content recorded while the user participated in the conference session need be presented, or the entire content can be presented, but presentation of the recorded content can begin at a point in the conference session when the user joined the conference session. Further, the recorded content can be presented to the user with a user selectable control to advance or regress through the recorded content. In an arrangement in which the recorded content only includes content recorded while the user participated in the conference session, such content can be presented to the user when the user selects the calendar entry 202.

Subsequent to the conference session identified by the calendar entry 202, the conference session identified by the calendar entry 204 may take place. Transcripts of the recorded content of the respective conference sessions can be automatically analyzed, for example by the calendaring application, to determine whether both conference sessions addressed at least one common subject. If so, an association between the respective conference sessions can be automatically created. Such association can be indicated to the user when the user accesses a recording of the content for either of the conference sessions via the calendar 132 and/or can be displayed in the calendar. In illustration, a line 230 can be presented in the calendar 132 indicating such association. Optionally, one or more subjects common to the conference sessions also can be indicated in the calendar 132 and/or presented to the user when the user accesses either of the recordings. Associations also can be created between the conference session identified by the calendar entry 202 and one or more other conference sessions in a similar manner. Further, associations between other conference sessions also can be created.

The user may desire to schedule future conference sessions via the calendar 132, for example a conference session indicated by a calendar entry 240. The calendaring application can identify such future conference session based on inputs by the user. Via the calendar 132, the user can indicate that such future conference session is associated with a previous conference session, such as the conference session associated with the calendar entry 202 and/or the conference session associated with the calendar entry 204. The calendaring application can automatically identify the participants of the associated conference session(s) and automatically suggest an invitee list for the future conference session to include such participants. In another arrangement, the calendaring application can analyze the transcript(s) of the recorded content for the associated conference session(s) to identify those participants who were most active in the associated conference session(s), and limit the suggested invitee list to include such participants. Such analysis can be based on a suitable algorithm that weights user participation based on activity in the associated conference session(s).

A suggested schedule for the conference session at a particular time and day also can be automatically generated by the calendaring application. For example, the calendaring application can access calendars for invitees to the future conference session to determine a time and day for which no other calendar entries exist. In illustration, the calendaring application can select the soonest business day in which all calendars have an open time slot. In some instances, there may not be such a time slot available within the near future or a particular window of time (e.g., within a next day, next week, next month, etc.). The window of time can be a default value or user selectable. In such case, each suggested invitee can be assigned a weight based on their participation in the associated conference session(s), and such weights can be processed to select the time and day from the future conference session. In illustration, preference can be given to identify open time slots for those who were more active in the associated conference sessions over those who were less active. Thus, the suggested time and day may conflict with other calendar entrees of those suggested invitees who were less active.

The user can be prompted to enter the duration of the future conference session, the calendaring application can select a default duration, or the calendaring application can assume a duration that is approximately equal to one or more of the associated conference sessions. When the time, day and duration are selected, the calendaring application can generate an invitation and communicate the invitation to each of the respective participants, for example after the user has reviewed such information and accepted the future calendar entry 240. The invitation can include the subject matter of the future conference and indicate the associated conference session(s).

The invitation also can indicate the type of the future conference session (e.g., web conference, IM session, chat room session, etc.) and/or the forum for hosting the future conference session. The forum can be an internal forum (i.e., provided within a particular organization), or an external forum (i.e., provided by a service external to a particular organization, such as a social networking site). In one arrangement, the type and/or forum can be selected by the user. In another arrangement, the calendaring application can automatically select a type and/or forum and generate a suggestion indicating that type/forum to the user.

In illustration, the calendaring application can suggest the type of conference session and/or the forum to host the future conference session to be the same as an associated conference session. In another example, the calendaring application can analyze the calendars of suggested invitees and, based on the type and/or forum the invitees typically use to participate in conference sessions, weight such conference types/forums, and process such weights to arrive at the suggestion. In illustration, if the majority of the suggested invitees typically participate in conference sessions via IM using a particular IM service, the calendaring application can suggest that the future conference session be scheduled using that IM service. If, however, the majority of invitees typically participate in conference sessions in a particular chat room, the calendaring application can suggest that the future conference session take place in that cat room. If the majority of invitees typically participate in conference sessions using a particular web conference service, the calendaring application can suggest that the future conference session take place using that web conference service. In some instances there may be no outright majority. Thus, the various available types/forums can be weighted based on past usage and/or invitee preferences, and the type/forum with the highest total weight can be suggested. In one arrangement, past usage and/or preferences of the suggested invitees further can be weighted based on the invitee's participation in the associated conference sessions. Thus, a preference of an invitee who was particularly active in an associated conference session can be given greater weight than an invitee who was not as active. The calendaring application can execute a suitable algorithm to apply the various weights.

In another aspect, the type of conference session and/or forum that is suggested to host the conference session can be selected based on an analysis of the transcript(s) of the associated conference session(s) and/or other recorded content. For example, the recorded content can indicate that a significant amount of time in the associated conference sessions was spent discussing particular points (e.g., a particular subject) that involved slides, images, graphics, etc. In such case, a web conference may be a more suitable forum for the future web conference since such visual content potentially may be discussed. If however, the associated conference(s) primarily involved text messages provided by the participants, an IM service or chat room may be more appropriate. In this regard, each potential type/forum can be weighted based on the analysis, and the type/forum with the greatest weight can be suggested.

Figure 3:
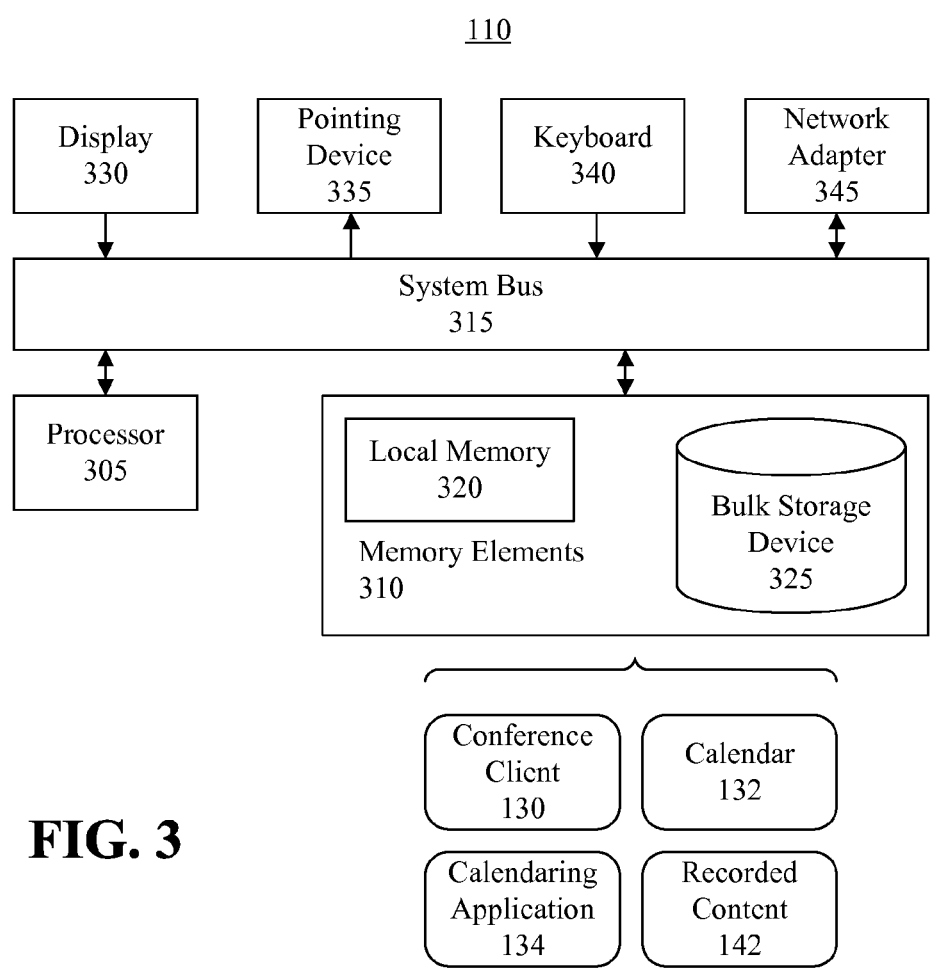
FIG. 3 is a block diagram illustrating a client device for integrating an electronic conference session with an electronic calendar in accordance with one embodiment disclosed within this specification.

FIG. 3 is a block diagram illustrating a system, and more particularly the client device 110, for integrating an electronic conference session with an electronic calendar in accordance with one embodiment disclosed within this specification. The client device 110 can include at least one processor 305 (e.g., a central processing unit) coupled to memory elements 310 through a system bus 315 or other suitable circuitry. As such, the client device 110 can store program code within the memory elements 310. The processor 305 can execute the program code accessed from the memory elements 310 via the system bus 315. It should be appreciated that the client device 110 can be implemented in the form of any system including a processor and memory that is capable of performing the functions and/or operations described within this specification. For example, the client device 110 can be implemented as a computer, a workstation, a mobile computer, a laptop computer, tablet computer, a smart phone, a personal digital assistant, a gaming device, an appliance, and so on.

The memory elements 310 can include one or more physical memory devices such as, for example, local memory 320 and one or more bulk storage devices 325. Local memory 320 refers to RAM or other non-persistent memory device(s) generally used during actual execution of the program code. The bulk storage device(s) 325 can be implemented as a hard disk drive (HDD), solid state drive (SSD), or other persistent data storage device. The client device 110 also can include one or more cache memories (not shown) that provide temporary storage of at least some program code in order to reduce the number of times program code must be retrieved from the bulk storage device 325 during execution.

Input/output (I/O) devices such as a display 330 and, optionally, a pointing device 335 and a keyboard 340, can be coupled to the client device 110. The I/O devices can be coupled to the client device 110 either directly or through intervening I/O controllers. For example, the display 330 can be coupled to the client device 110 via a graphics processing unit (GPU), which may be a component of the processor 305 or a discrete device. One or more network adapters 345 also can be coupled to client device 110 to enable client device 110 to become coupled to other systems, computer systems, remote printers, and/or remote storage devices through intervening private or public networks. Modems, cable modems, and Ethernet cards are examples of different types of network adapters 345 that can be used with client device 110.

As pictured in FIG. 3, the memory elements 310 can store the components of the client device 110, such the conference client 130, the calendar 132 and the calendaring application 134. Being implemented in the form of executable program code, these components of the client device 110 can be executed by the client device 110 (e.g., via the processor 305) and, as such, can be considered part of the client device 110. Moreover, the conference client 130, the calendar 132 and the calendaring application 134 are functional data structures that impart functionality when employed as part of the client device 110 of FIG. 3. The recorded content also can be stored to the memory elements 310. As noted, in other arrangements, one or more of the conference client 130, the calendar 132, the calendaring application 134 and the recorded content 142 can be stored on another device or system to which the client device 110 is communicatively linked, and the client device 110 can access such other device or system to perform functions and operations described herein.

Figure 4:
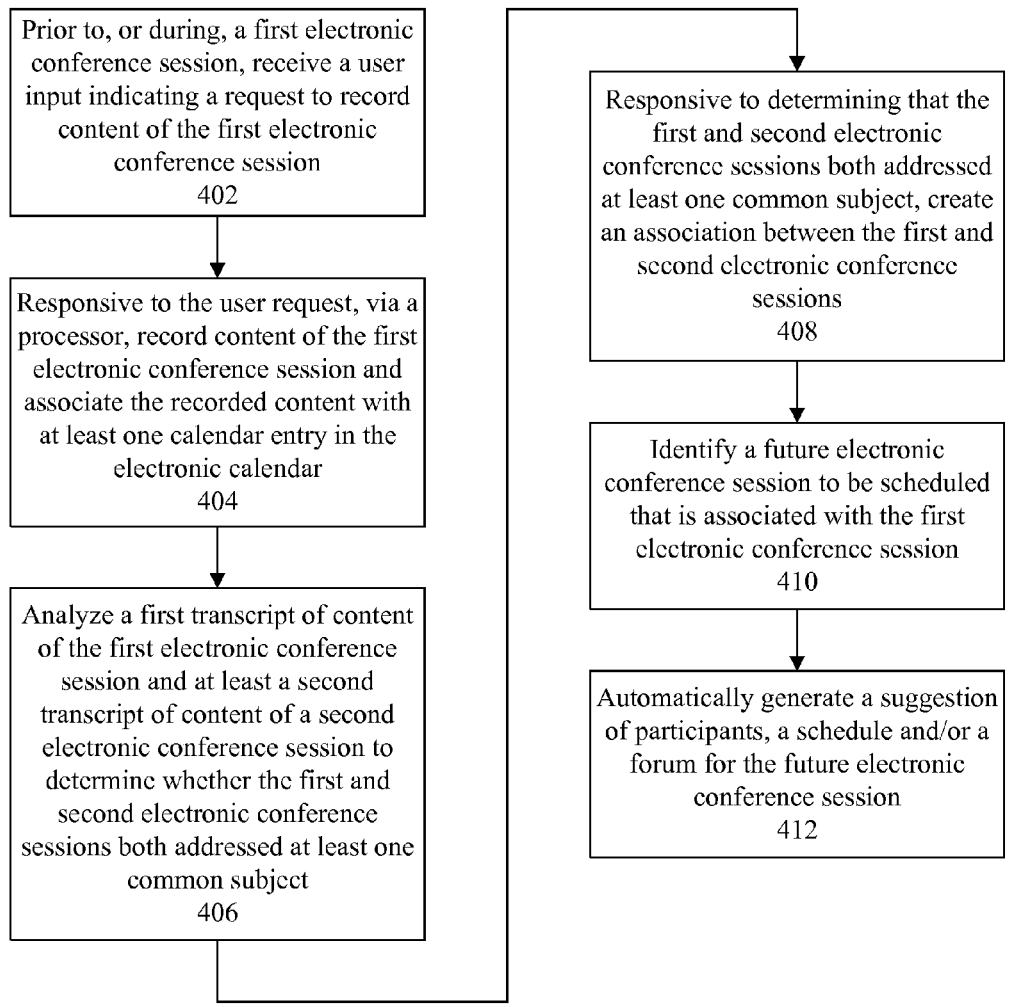
FIG. 4 is a flow chart illustrating a method of integrating an electronic conference session with an electronic calendar in accordance with another embodiment disclosed within this specification.

FIG. 4 is a flow chart illustrating a method 400 of integrating an electronic conference session with an electronic calendar in accordance with another embodiment disclosed within this specification. At step 402, prior to, or during, a first electronic conference session, a user indicating a request to record content of the first electronic conference session can be received. At step 404, responsive to the user request, via a processor, content of the first electronic conference session can be recorded and associated with at least one calendar entry in the electronic calendar. As noted, content the entire conference session can be recorded, or only content for a portion of the conference session, for example for a portion of the first electronic conference session in which the user participated. When content for one or more other portions of the conference session are recorded, in the calendar entry a period corresponding to the portion of the first electronic conference session in which the user participated can be delineated to distinguish recorded content for that portion from recorded content of at least one other portion of the first electronic conference session.

At step 406, a first transcript of content of the first electronic conference session and at least a second transcript of content of a second electronic conference session can be analyzed to determine whether the first and second electronic conference sessions both addressed at least one common subject. At step 408, responsive to determining that the first and second electronic conference sessions both addressed at least one common subject, an association between the first and second electronic conference sessions can be created. In illustration, the association can be presented in the electronic calendar.

At step 410, a future electronic conference session to be scheduled that is associated with the first electronic conference session can be identified. In illustration, a user input can be received indicating that the future electronic conference session is to be scheduled. At step 412, a suggestion of participants, a schedule and/or a forum for the future electronic session can be automatically generated, for example as described herein. In illustration, the suggestion can be presented to the user via a display of the user's client device, or in any other suitable manner.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A method of associating electronic conference session content with an electronic calendar, the method comprising:
    prior to, or during, a first electronic conference session, receiving a user input indicating a request to record content of the first electronic conference session;
    responsive to the user request, via a processor, recording content of the first electronic conference session; and
    delineating in at least one calendar entry in the electronic calendar a first period corresponding to a portion of the first electronic conference session in which the user participated to distinguish recorded content for that portion of the first electronic conference session from recorded content of at least one other portion of the first electronic conference session in which the user did not participate in, wherein the first period in the calendar entry is user selectable to exclusively access the portion of the first electronic conference session in which the user participated.

2. The method of claim 1, wherein a second period in the calendar entry corresponding to the other portion of the first electronic conference session is user selectable to access the entire recorded content.

3. The method of claim 1, wherein recording the content of the first electronic conference session comprises:
    recording only content for a portion of the first electronic conference session in which the user participated, and associating that recorded content with the calendar entry.

4. The method of claim 1, further comprising:
    identifying a future electronic conference session to be scheduled that is associated with the first electronic conference session;
    based on a plurality of users who participated in the first electronic session, automatically selecting a time to host the future electronic conference session; and
    automatically generating a suggested schedule for the future electronic conference session at the selected time.

5. The method of claim 1, further comprising:
    identifying a future electronic conference session to be scheduled that is associated with the first electronic conference session;
    identifying in the first electronic conference session participants who were most active in the first electronic conference session; and
    generating a suggested list of attendees for the future electronic conference session, the suggested list comprising the participants who were most active in the first electronic conference session.

6. The method of claim 1, further comprising:
    identifying a future electronic conference session to be scheduled that is associated with the first electronic conference session;
    analyzing a transcript of content of the first electronic conference session to identify at least one subject of the first electronic conference session;
    automatically selecting, based on the identified subject of the first electronic conference session, a forum to host the future electronic conference session; and
    generating a suggestion of the selected forum.

7. The method of claim 1, further comprising:
    identifying a future electronic conference session scheduled to include a plurality of users who participated in the first electronic session;

automatically selecting, based on the plurality of users, a forum to host the future electronic conference session; and generating a suggestion of the selected forum.

8. The method of claim 1, further comprising:

analyzing a first transcript of content of the first electronic conference session and at least a second transcript of content of a second electronic conference session to determine whether the first and second electronic conference sessions both addressed at least one common subject; and responsive to determining that the first and second electronic conference sessions both addressed at least one common subject, creating an association between the first and second electronic conference sessions.

9. A method of associating electronic conference session content with an electronic calendar, the method comprising:

prior to, or during, an electronic conference session, receiving a user input indicating a request to record content of the electronic conference session; and responsive to the user request, via a processor, recording content of the electronic conference session; and associating the recorded content of the electronic conference session with at least one calendar entry in the electronic calendar, wherein associating the recorded content with at least one calendar entry in the electronic calendar comprises:

indicating in the calendar entry a first period corresponding to a duration of the electronic conference session for which the content is recorded; and indicating in the calendar entry, within the first period, a second period in which the user participated in the electronic session using an indicator that distinguishes the second period from at least one other portion of the first period in which the user did not participate in, wherein the second period in the calendar entry is user selectable to exclusively access the portion of the first electronic conference session in which the user participated.

10. A system comprising:

a processor programmed to initiate executable operations comprising:

prior to, or during, a first electronic conference session, receiving a user input indicating a request to record content of the first electronic conference session; and responsive to the user request, recording content of the first electronic conference session; and delineating in at least one calendar entry in the electronic calendar a first period corresponding to a portion of the first electronic conference session in which the user participated to distinguish recorded content for that portion of the first electronic conference session from recorded content of at least one other portion of the first electronic conference session in which the user did not participate in, wherein the first period in the calendar entry is user selectable to exclusively access the portion of the first electronic conference session in which the user participated.

11. The system of claim 10, wherein a second period in the calendar entry corresponding to the other portion of the first electronic conference session is user selectable to access the entire recorded content.

12. The system of claim 10, wherein recording the content of the first electronic conference session comprises:

recording only content for a portion of the first electronic conference session in which the user participated, and associating that recorded content with the calendar entry.

13. The system of claim 10, wherein the executable operations further comprise:

identifying a future electronic conference session to be scheduled that is associated with the first electronic conference session;

based on a plurality of users who participated in the first electronic session, automatically selecting a time to host the future electronic conference session; and automatically generating a suggested schedule for the future electronic conference session at the selected time.

14. The system of claim 10, wherein the executable operations further comprise:

identifying a future electronic conference session to be scheduled that is associated with the first electronic conference session;

identifying in the first electronic conference session participants who were most active in the first electronic conference session; and generating a suggested list of attendees for the future electronic conference session, the suggested list comprising the participants who were most active in the first electronic conference session.

15. The system of claim 10, wherein the executable operations further comprise:

identifying a future electronic conference session to be scheduled that is associated with the first electronic conference session;

analyzing a transcript of content of the first electronic conference session to identify at least one subject of the first electronic conference session;

automatically selecting, based on the identified subject of the first electronic conference session, a forum to host the future electronic conference session; and generating a suggestion of the selected forum.

16. The system of claim 10, wherein the executable operations further comprise:

identifying a future electronic conference session scheduled to include a plurality of users who participated in the first electronic session;

automatically selecting, based on the plurality of users, a forum to host the future electronic conference session; and generating a suggestion of the selected forum.

17. The system of claim 10, wherein the executable operations further comprise:

analyzing a first transcript of content of the first electronic conference session and at least a second transcript of content of a second electronic conference session to determine whether the first and second electronic conference sessions both addressed at least one common subject; and responsive to determining that the first and second electronic conference sessions both addressed at least one common subject, creating an association between the first and second electronic conference sessions.

18. A computer program product for associating electronic conference session content with an electronic calendar, the computer program product comprising a computer readable storage medium having program code stored thereon, the program code executable by a processor to perform a method comprising:

prior to, or during, a first electronic conference session, receiving a user input indicating a request to record content of the first electronic conference session;

responsive to the user request, recording content of the first electronic conference session; and delineating in at least one calendar entry in the electronic calendar a first period corresponding to a portion of the first electronic conference session in which the user participated to distinguish recorded content for that portion of the first electronic conference session from recorded content of at least one other portion of the first electronic conference session in which the user did not participate in, wherein the first period in the calendar entry is user selectable to exclusively access the portion of the first electronic conference session in which the user participated.

19. The computer program product of claim 18, wherein a second period in the calendar entry corresponding to the other portion of the first electronic conference session is user selectable to access the entire recorded content.

20. The computer program product of claim 18, wherein recording the content of the first electronic conference session comprises:

recording only content for a portion of the first electronic conference session in which the user participated, and associating that recorded content with the calendar entry.

21. The computer program product of claim 18, wherein the method further comprises:

identifying a future electronic conference session to be scheduled that is associated with the first electronic conference session;

based on a plurality of users who participated in the first electronic session, automatically selecting a time to host the future electronic conference session; and automatically generating a suggested schedule for the future electronic conference session at the selected time.

22. The computer program product of claim 18, wherein the method further comprises:

identifying a future electronic conference session to be scheduled that is associated with the first electronic conference session;

identifying in the first electronic conference session participants who were most active in the first electronic conference session; and generating a suggested list of attendees for the future electronic conference session, the suggested list comprising the participants who were most active in the first electronic conference session.

23. The computer program product of claim 18, wherein the method further comprises:

identifying a future electronic conference session to be scheduled that is associated with the first electronic conference session;

analyzing a transcript of content of the first electronic conference session to identify at least one subject of the first electronic conference session;

automatically selecting, based on the identified subject of the first electronic conference session, a forum to host the future electronic conference session; and generating a suggestion of the selected forum.

24. The computer program product of claim 18, wherein the method further comprises:

identifying a future electronic conference session scheduled to include a plurality of users who participated in the first electronic session;

automatically selecting, based on the plurality of users, a forum to host the future electronic conference session; and generating a suggestion of the selected forum.

25. The computer program product of claim 18, wherein the method further comprises:

analyzing a first transcript of content of the first electronic conference session and at least a second transcript of content of a second electronic conference session to determine whether the first and second electronic conference sessions both addressed at least one common subject; and responsive to determining that the first and second electronic conference sessions both addressed at least one common subject, creating an association between the first and second electronic conference sessions.

* * * * *